US006714988B2

(12) United States Patent
Takemoto et al.

(10) Patent No.: US 6,714,988 B2
(45) Date of Patent: Mar. 30, 2004

(54) SYSTEM AND METHOD FOR CONNECTING ANALOG TELEPHONES AND FACSIMILE MACHINES TO THE INTERNET

(75) Inventors: Yuuji Takemoto, Tokyo (JP); Kazuto Kobayashi, Kawasaki (JP); Kazuyoshi Koreeda, Saitama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 129 days.

(21) Appl. No.: 10/057,993

(22) Filed: Jan. 29, 2002

(65) Prior Publication Data

US 2003/0023748 A1 Jan. 30, 2003

(30) Foreign Application Priority Data

Jul. 2, 2001 (JP) ....................................... 2001-200617

(51) Int. Cl.[7] .......................... G06F 15/16; H04N 1/32; H04M 11/00

(52) U.S. Cl. ....................... 709/249; 358/442; 379/900; 379/90.01

(58) Field of Search ................................ 709/249–250; 379/90.01, 900, 100.09, 100.13, 100.15; 358/407, 426.02, 426.08, 442, 305

(56) References Cited

U.S. PATENT DOCUMENTS 5,018,191 A * 5/1991 Catron et al. .......... 379/100.09
5,905,782 A * 5/1999 Lee et al. ............. 379/100.01
5,943,140 A * 8/1999 Monroe ...................... 358/442
5,949,859 A * 9/1999 O'Toole ................ 379/100.14
6,097,797 A * 8/2000 Oseto .................... 379/100.08
6,157,846 A * 12/2000 Manning et al. ............ 455/557
6,384,927 B1 * 5/2002 Mori ......................... 358/1.15
6,411,684 B1 * 6/2002 Cohn et al. .............. 379/88.14
6,424,647 B1 * 7/2002 Ng et al. ..................... 370/352
6,473,423 B1 * 10/2002 Tebeka et al. .............. 370/352
6,542,472 B1 * 4/2003 Onuma ....................... 370/253
2001/0014095 A1 * 8/2001 Kawahata et al. .......... 370/392
2002/0126817 A1 * 9/2002 Hariri et al. ........... 379/201.01

FOREIGN PATENT DOCUMENTS

JP 03038152 A * 2/1991 ............ H04M/3/00
JP 03101557 A * 4/1991 ............ H04M/3/42
JP 3133297 8/2000
JP 2000224333 A * 8/2000 .......... H04M/11/00

OTHER PUBLICATIONS

Newton, H., Newton's Telecom Dictionary, Telecom Books, pp. 225–226, 255, 1998.*
English Language Abstract of JP 3133297.

* cited by examiner

*Primary Examiner*—Andrew Caldwell
(74) *Attorney, Agent, or Firm*—Greenblum & Bernstein, P.L.C.

(57) ABSTRACT

An Internet communication control apparatus and its transmission control method is provided, to which communication terminals such as facsimile apparatuses and/or telephones are connected, that is connected to the Internet to perform transmission/reception with other communication terminals. When an off-hook state of a connected communication terminal is detected upon transmitting, a setting for dial tone signal reception is prepared, and the received signals are converted to a destination number. By checking the corresponding table, the destination number is converted into a destination address, and according to the content of the table, whether the communication is for facsimile transmission or telephone call is determined. According to the result of the determination, a facsimile process or telephone process is selectively performed so that the transmission operation does not seem abnormal and complicated.

11 Claims, 6 Drawing Sheets

Facsimile Apparatus
Communication Control Apparatus
mail Server
Off Hook
DT Signal
Press 1
DTMF Signal
DTMF Detector 1
1 save(1)
Press 2
DTMF Signal
DTMF Detector 1
2 save(12)
Press 3
DTMF Signal
CNG
DTMF Detector 1
3 save(123)
CED
Start
CED Detector
FAX Transmission Steps
FAX Number matches
FAX Reception
(Transmit CED)
FAX Communication
(G3FAX)
Finish Transmission
Terminate Line
Finish Reception
Terminate Line
Send to the registered mail server with the mail address that matches with the phone number

Fig. 4

Table for Telephone

Table for Facsimile (a)

Table for Facsimile

| Number | mail Address |
|---|---|
| 123456 | Test1@xxx.xxx.co.cp |
| 345466 | Test2@xxx.xxx.co.jp |
| 465367 | Test3@xxx.xxx.co.jp |
| | |
| | |

(b)

Table for Telephone

| Number | IP Address |
|---|---|
| 456789 | 123,456,789,11 |
| 567890 | 234,567,890,12 |
| 6478901 | gatekeeper |
| | |
| | |

(c)

SYSTEM AND METHOD FOR CONNECTING ANALOG TELEPHONES AND FACSIMILE MACHINES TO THE INTERNET

BACKGROUND OF THE INVENTION

1. Field of the Invention

The present invention relates to an Internet communication control apparatus and its transmission control method to perform Internet phone and facsimile communication via network and Internet, using ordinary telephones and facsimile apparatuses.

2. Description of Related Art

In recent years, with a widespread of Internet uses, various forms of devices that use the Internet, such as Internet phones and facsimiles, have become available. For example, in the Japanese Patent No. 3133297, which has the same applicant for this application, a communication control apparatus has been proposed, which can perform Internet phone and facsimile communication connecting to analog communication terminals such as ordinary telephones and facsimiles.

According to such an apparatus, an ordinary telephone conversation is converted from analog to digital and transmitted to an Internet phone of the other side, using Internet phone protocols. Also, data scanned by a facsimile is attached to e-mail, by converting the data into a TIFF file, and transmitted to an Internet facsimile apparatus of the other side.

The processes for telephone and facsimile are completely different. When receiving a communication, it is possible to distinguish whether it is of a telephone or facsimile from the differences of protocols. However, when transmitting a communication, it is necessary to determine whether it is of a telephone or facsimile, before originating a call. In the above-described communication control apparatus, "#" or "*" is input in front of a number when originating a call for the determination. The input number from the communication terminal is converted into an IP address or mail address at a conversion table, and the processes for the above Internet phone or Internet facsimile are performed.

However, inputting a symbol in front of a number for the determination results in an increase of input digits and complication of operation. Further, by performing such an abnormal step, the operation seems abnormal.

It can be considered to register connected terminals to classify whether they are telephones or facsimile apparatuses; however, it is not a complete solution since there are telephones with facsimile apparatus functions.

For ordinal telephones and facsimile apparatuses that are connected to telephone lines, an operator inputs a number according to a tone signal from an exchange and outputs dial tone signals. The operator then confirms, from the reply of the exchange, whether a DT (dial tone) signal is output or RT (ring-back tone) signal is received. However, upon transmitting with the above-described communication control apparatus, the communication terminal is not connected to the outer exchange, but the communication terminal is connected via the above-described communication control apparatus. Therefore, the operation seems abnormal.

SUMMARY OF THE INVENTION

This invention is provided in view of the above-described problems. The object of the present invention is provide an Internet communication control apparatus and its transmission control method that is capable of performing transmission to other communication terminals from ordinary telephones or facsimile apparatuses via the Internet, without creating an abnormal condition for operators and without complicating the operation.

The above-described object is achieved, according to the present invention, by an Internet communication control apparatus, to which communication terminals of facsimile apparatus and/or telephone is connected, and which is also connected the Internet, that performs transmission/reception with other communication terminals via the Internet by converting transmission requests from the communication terminals. The Internet communication control apparatus comprises an off-hook detector that detects whether the communication terminal is off the hook, when transmitting; a unit that prepares a dial tone signal reception state when the communication terminal is detected to be off the hook and that converts the dial tone signals received from the communication terminal into a destination number; a corresponding table that includes converted destination numbers and destination addresses; and a number moderator that converts the destination number into a destination address by checking the corresponding table and that determines from the content of the corresponding table whether the destination for the transmission is a facsimile apparatus or telephone. Accordingly, the input destination number from the communication terminal is converted by checking the corresponding table, while whether the destination is facsimile apparatus or telephone is checked so that the facsimile process or telephone process is selectively performed according to the result of the determination.

It is preferable to provide the unit, which prepares a dial tone signal reception state and converts the dial tone signals received from the communication terminal into a destination number, with a dial tone signal generator that generates and outputs dial tone signals to the corresponding communication terminal, when the communication terminal is detected to be off the hook by the off-hook detector, and with a dial tone detector that enables the dial tone signals from the communication terminal to be received, when the off-hook detector detects an off-hook state, and that converts the received dial tone signals from the communication terminal into a destination number. Accordingly, the input destination number from the communication terminal is converted by checking the corresponding table, according to the dial tone signals from the dial tone signal generator. Also, whether the destination is a facsimile apparatus or telephone is checked so that a facsimile process or telephone process is selectively performed according to the result of the determination.

Also, it is preferable to provide the number moderator with a function that can determine whether the destination is a facsimile apparatus or telephone, from the content of the destination address, which is converted from the destination number. It is also preferable that the corresponding table comprises a facsimile table and telephone table, so that the number moderator can determine whether the destination is a facsimile apparatus or telephone, by checking whether the destination number is in the facsimile table or telephone table.

The above-described object is achieved, according to the present invention, by the transmission control method for the Internet communication control apparatus, to which communication terminals of facsimile apparatus and/or telephone is connected, and which is also connected the Internet, that performs transmission/reception with other communication terminals via the Internet by converting transmission requests from the communication terminals.

The transmission control method comprises detecting whether the communication terminal is off the hook, when transmitting; having a mode that receives a dial tone signals when the communication terminal is detected to be off the hook and that converts the dial tone signals received from the communication terminal into a destination number; converting the input dial tone signals from the communication terminal into a destination number; converting the destination number into a destination address by checking the corresponding table that includes the destination numbers and destination addresses; determining whether the destination for the transmission is a facsimile apparatus or telephone; and selectively performing the facsimile process or telephone process according to the result of the determination.

It is preferable that the mode, which receives a dial tone signal when the communication terminal is detected to be off the hook and which converts the input dial tone signals from the communication terminal into a destination number, generates and outputs dial tone signals to the corresponding communication terminal when the communication terminal is detected to be off the hook, and converts the input dial tone signals from the communication terminals into a destination number. It is also preferable to convert the input dial tone signals from the communication terminal into a destination number, according to the dial tone signals, to convert the destination number into a destination address by checking a corresponding table that includes destination numbers and destination addresses; to determine whether the destination is a facsimile apparatus or telephone; and to selectively perform a facsimile process or telephone process, according to the result of the determination.

Further, upon determining whether the destination is a facsimile apparatus or telephone, from the content of the destination address, which is converted from the destination number, it is preferable to provide the corresponding table that includes a facsimile table and telephone table, so that whether the destination is a facsimile apparatus or telephone is determined by checking whether the destination number is in the facsimile table or telephone table.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIGS. 4 (*a*), (*b*), and (*c*) illustrate a configuration of a corresponding table 15;

DETAILED DESCRIPTION OF PREFERRED EMBODIMENTS

The embodiment of the present invention is explained in the following, in reference to the above-described drawings.

Figure 1:
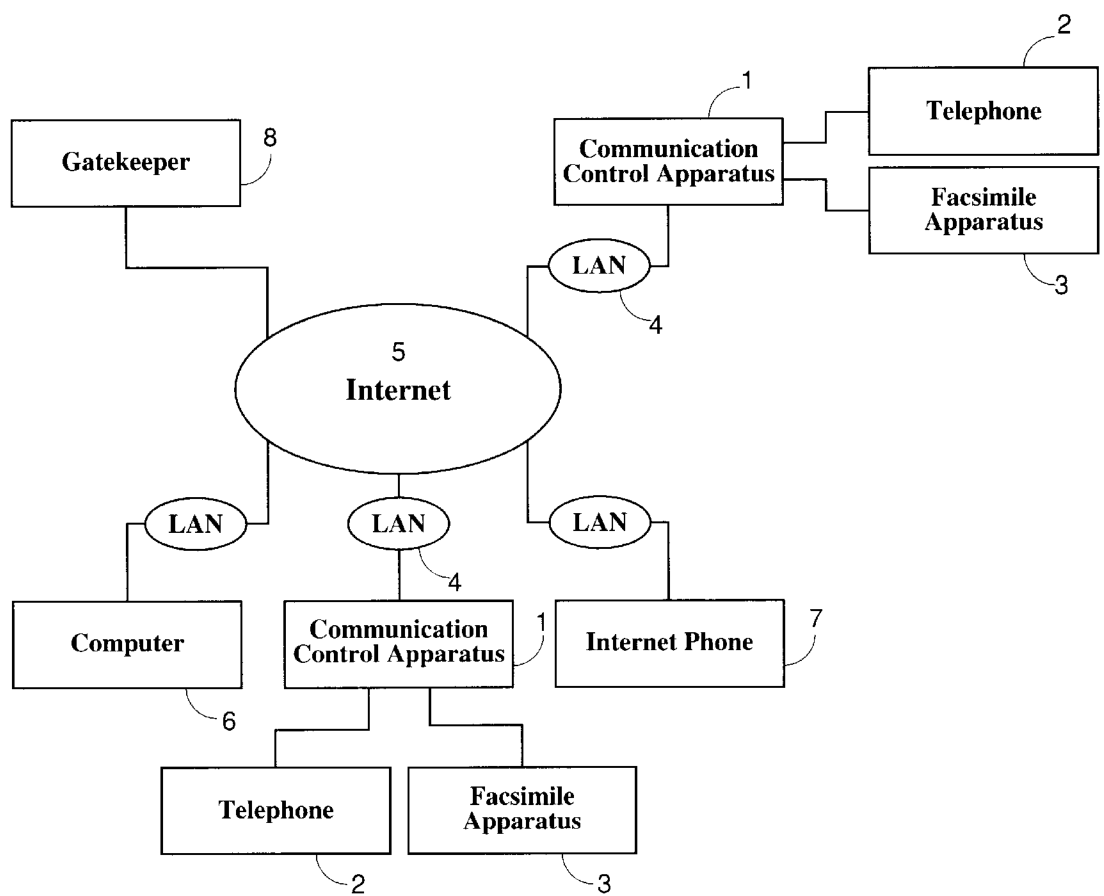
FIG. 1 illustrates a configuration of a state that the Internet communication control apparatus is connected to the Internet via a LAN.

FIG. 1 illustrates a configuration of a state that an Internet communication control apparatus 1 according to the present invention, to which a telephone 2 and a facsimile apparatus 3 are connected, is connected to the Internet 5 via a LAN 4. Another Internet communication control apparatus 1 via another LAN, a computer 6 with Internet facsimile functions and Internet phone functions, an Internet phone 7 dedicated only for Internet use, and a gatekeeper 8 that stores telephone numbers associated with IP addresses and notifies the sender terminal of an IP address associated with the input telephone number when telephone communication is requested, are connected to the Internet 5.

Figure 2:
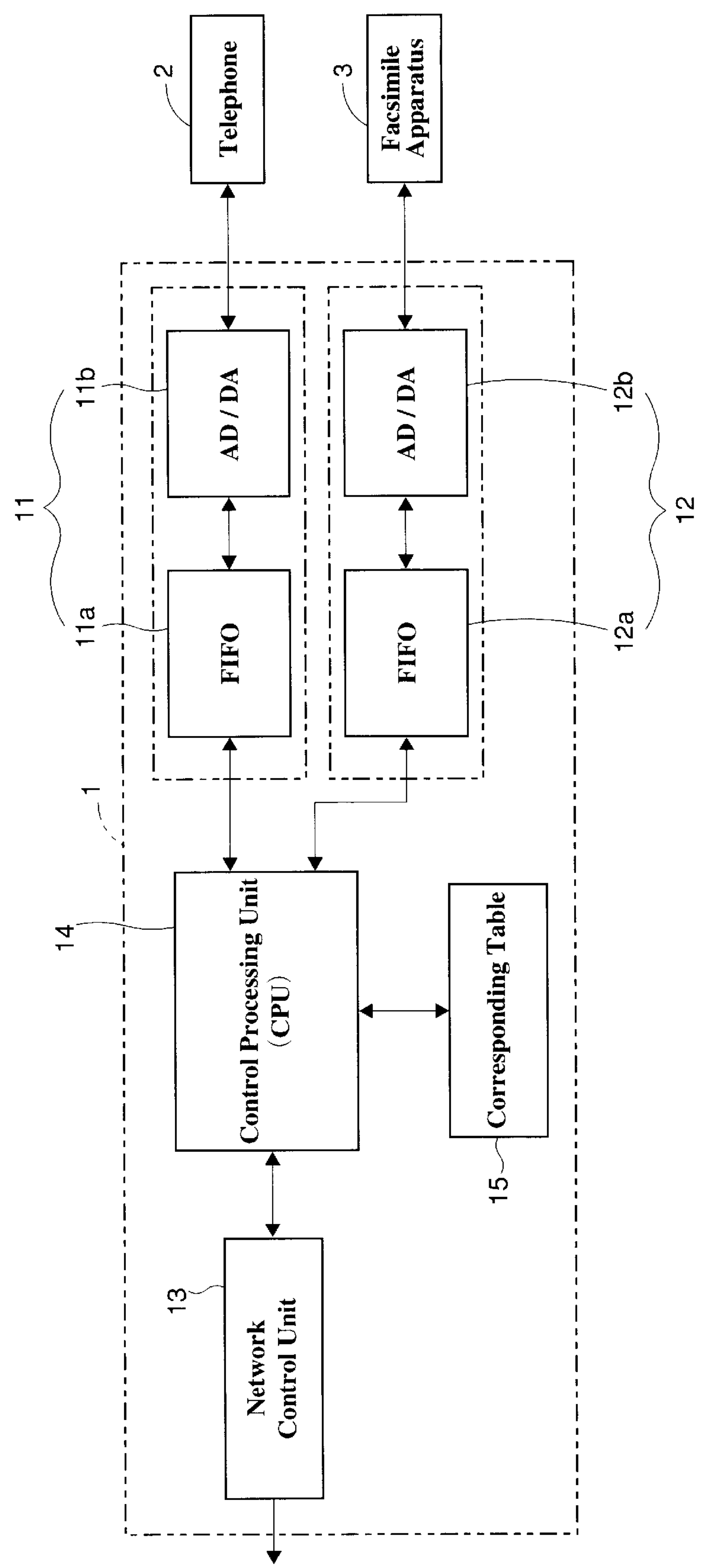
FIG. 2 is a block diagram illustrating a configuration of the Internet communication control apparatus according to the embodiment of the present invention.

FIG. 2 is a block diagram illustrating a configuration of the Internet communication control apparatus 1. This communication control apparatus 1 comprises two terminal interfaces 11 and 12 that are connected to a telephone 2 and facsimile apparatus 3; a network control unit 13 that is connected to the LAN 4; a central processing unit (CPU) 14 that analyzes a transmission request from the telephone 2 and the facsimile 3 to create a packet, performs data transmission via the network control unit 13, receives data from the network control unit 13, and transmits the reception data to the corresponding telephone 2 or facsimile 3; a corresponding table 15 that associates the phone number or speed dial number with the corresponding IP address or mail address, from the transmission request from the telephone 2 or facsimile 3.

The terminal interfaces 11 and 12 are comprised with AD/DA converter 11*a* and 12*a*, and FIFO memory 11*b* and 12*b*.

Figure 3:
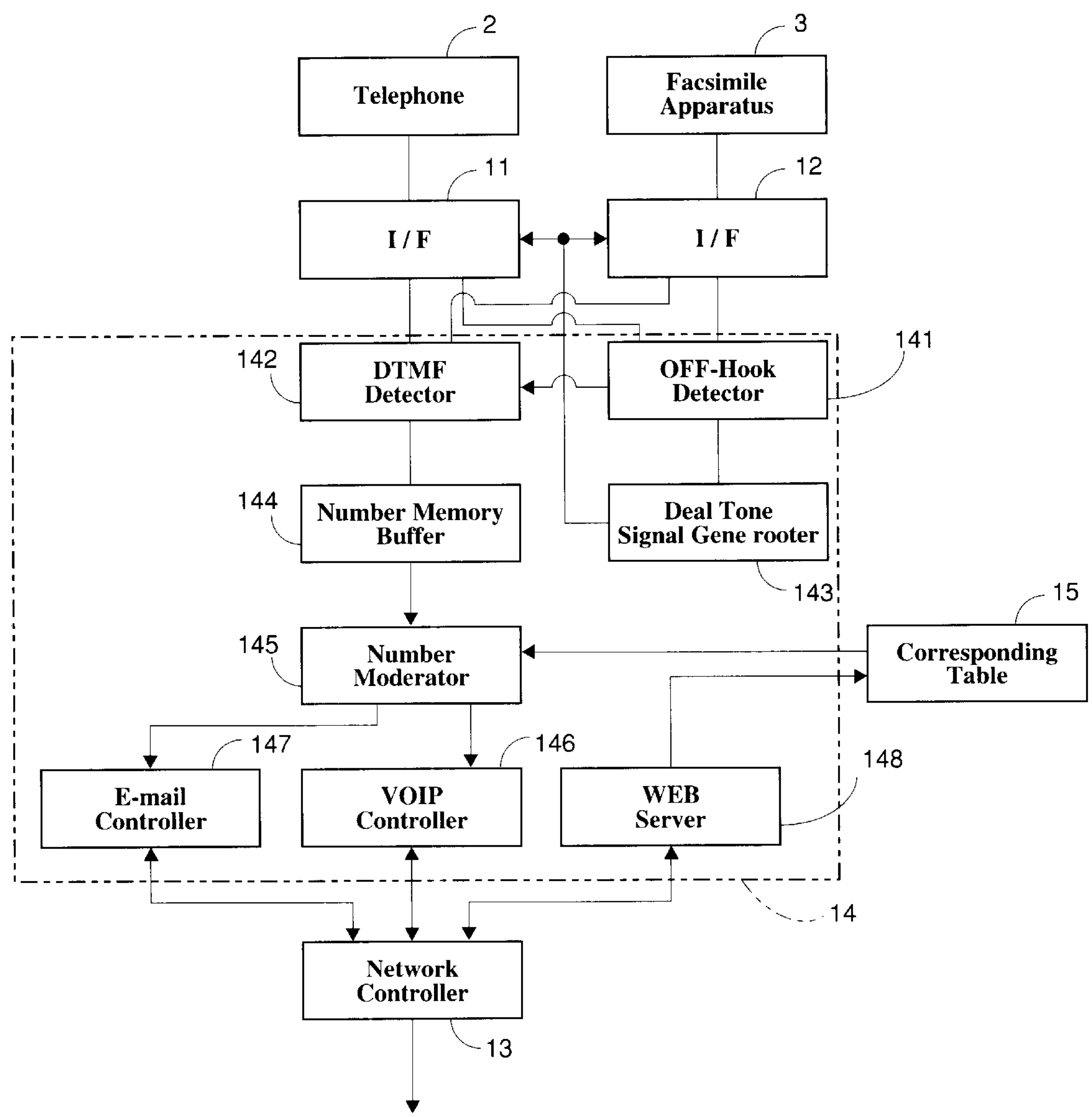
FIG. 3 is a block diagram illustrating a configuration of important sections of a central processing unit (CPU) 14.

FIG. 3 is a block diagram illustrating a configuration of units only for transmission and common units for transmission and reception in the central processing unit (CPU) 14. In this embodiment, the configuration of units only for reception is omitted from the explanation and the drawing, since it is publicly known.

In the central processing unit (CPU) 14, the telephone 2 and facsimile apparatus 3 are connected to, via the terminal interfaces 11 and 12, off-hook detector 141 that detects off-hook status; DTMF detector 142 that enables DTMF signals from the telephone 2 and facsimile apparatus 3 to be received, when an off-hook status is detected, and converts the received DTMF signals to a number; and dial tone signal generator 143 that generates a dial tone signals when an off-hook status is detected, and outputs the signals to the corresponding communication terminal. The DTMF detector 142 is connected to a number moderator 145 via a number memory buffer 144. The number moderator 145 checks the corresponding table 15, converts the input number from the telephone 2 and facsimile apparatus 3 into a corresponding IP address or mail address, in later described steps, and determines whether the operator is making a telephone call or transmitting a facsimile message.

The number moderator 145 is connected to a VOIP controller 146 that controls procedures for Internet phones, and an e-mail controller 147 that controls procedures for Internet facsimiles. These VOIP controller 146 and e-mail controller 147 are connected to the network control unit 13. According to the result of the determination whether the operator is making a telephone call or sending a facsimile message, a process is performed for an Internet phone by the VOIP controller 146, or for an Internet facsimile by the e-mail controller 147.

In addition, WEB server 148 is provided to be able to change the content of the corresponding table 15 via a WEB browser from outside.

FIGS. 4 (*a*), (*b*), and (*c*) illustrate a configuration of the corresponding table 15. The corresponding table 15 is comprised of a facsimile table 151 and telephone table 152. The facsimile table 151 stores numbers and the corresponding mail addresses (FIG. 4 (*b*)), while the telephone table 152 stores numbers and the corresponding IP addresses (FIG. 4 (*c*)).

Figure 5:
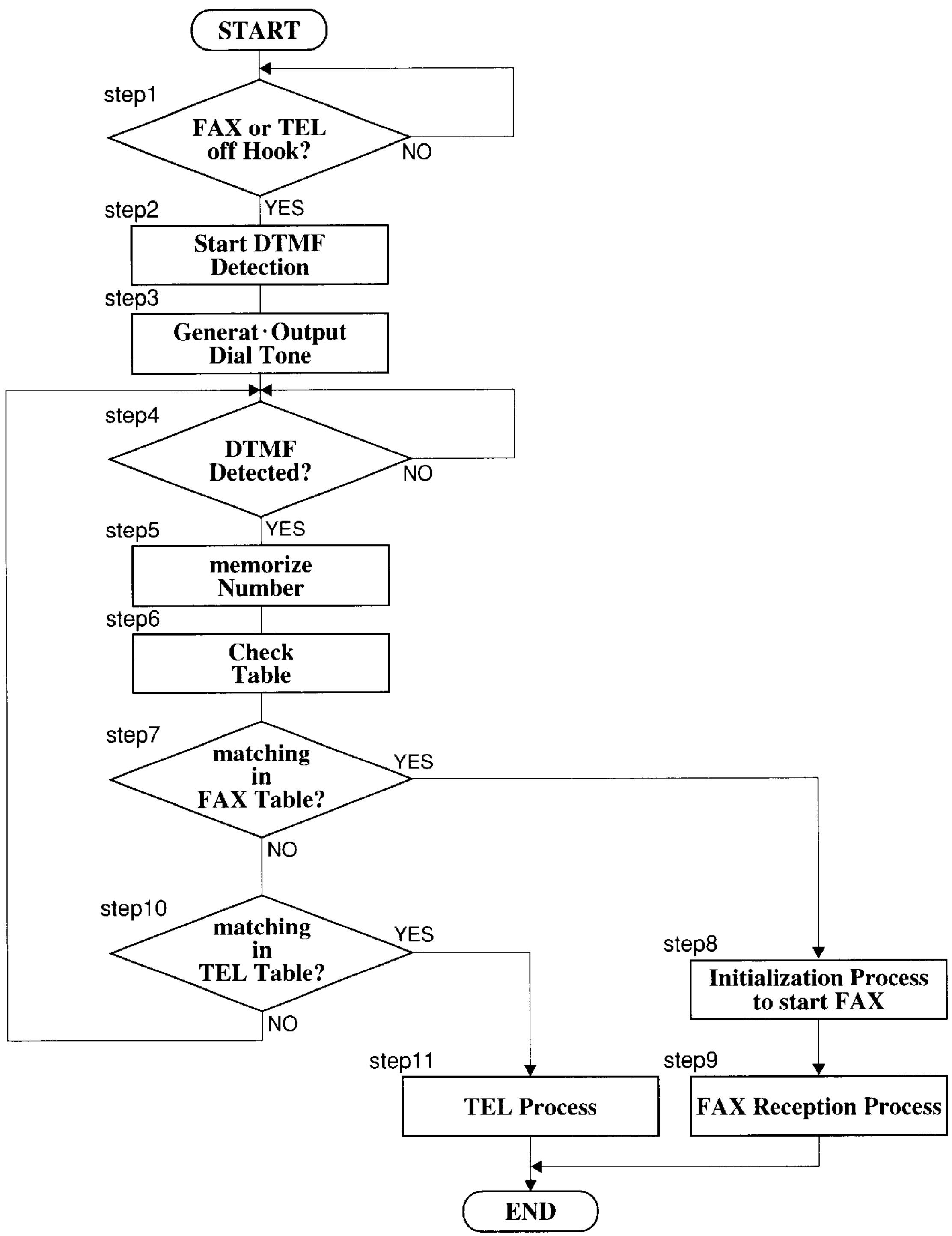
FIG. 5 is a flowchart illustrating a transmission process of the Internet communication control apparatus according to the embodiment of the present invention.

The following explains the steps for making a telephone call from the telephone 2 or transmitting a facsimile message from the facsimile apparatus 3, in reference to a flowchart in FIG. 5.

First, when the telephone 2 or the facsimile apparatus 3 is off the hook, the off-hook detector 141 detects the off-hook status at Step 1. Then the DTMF detector 142 at Step 2 enables DTMF signals to be received. The dial tone signal generator 143 further generates the same dial tone signals as the dial tone signals from a normal exchange, and outputs the signals to the corresponding communication terminal (the telephone 2 or the facsimile apparatus 3) (Step 3). Accordingly, the operator can recognize that the communication terminal is waiting for a number input, and it becomes easy to operate the communication terminal.

Next, upon detecting DTMF signals from the communication terminal (the telephone 2 or the facsimile apparatus 3) at Step 4, the signals are converted into a number and stored in the number memory buffer 144 (Step 5). At Step 6, the number is checked against the facsimile table 151 and telephone table 152 in the corresponding table 15. Step 7 checks whether there is a matching number in the facsimile table 151. If there is a matching number in the facsimile table 151, it is determined that the message is facsimile transmission from the facsimile apparatus 3. Step 8 initializes the process to start a facsimile procedure. At Step 9, facsimile transmission is performed from the facsimile apparatus 3 to the communication control apparatus 1. Further, the e-mail controller 147 converts the facsimile data into a TIFF formatted file and attaches the same with e-mail to be transmitted to the other side.

If the number does not exist in the facsimile table 151 at Step 7, Step 10 checks whether there is a matching number in the telephone table 152. If there is a matching number in the telephone table 152, a VOIP controller 146 performs a telephone process according to the UDP protocols at Step 11.

As for mail addresses, there are mail servers with fixed IP, and by using a DNS server, data is delivered to an appropriate mail server even if the mail address is not managed by the mail server. However, for a telephone call made to the party that does not have a fixed IP, the number for the gatekeeper 8 is input, the IP is accessed. According to the communication, the IP of the other party is obtained and the telephone process is continued.

At Step 10, if the number cannot be found in the telephone table 152, the control returns the process to Step 4 and waits for subsequent DTMF signals from the communication terminal (the telephone 2 or the facsimile apparatus 3). When DTMF signals are detected, the signals are converted to a number and stored in the number memory buffer 144, together with the previous number (Step 5). Similar to the above, the number is checked against the facsimile table 151 and telephone table 152 (Steps 7 and 10). If there is a matching number, a process is performed according the corresponding table (Steps 8, 9 or 11).

By repeating this process, transmission is started when the last digit of the registered number is input, similar to making an ordinary telephone call and facsimile transmission. Therefore, the operation does not seem abnormal. Although it is not shown in the drawing, by setting the maximum number of input digits, an error process can be performed when there is no matching number either in the facsimile table 151 or telephone table 152 and the number of input digits reaches the maximum, by outputting an error message or busy tone to the communication terminal.

Figure 6:
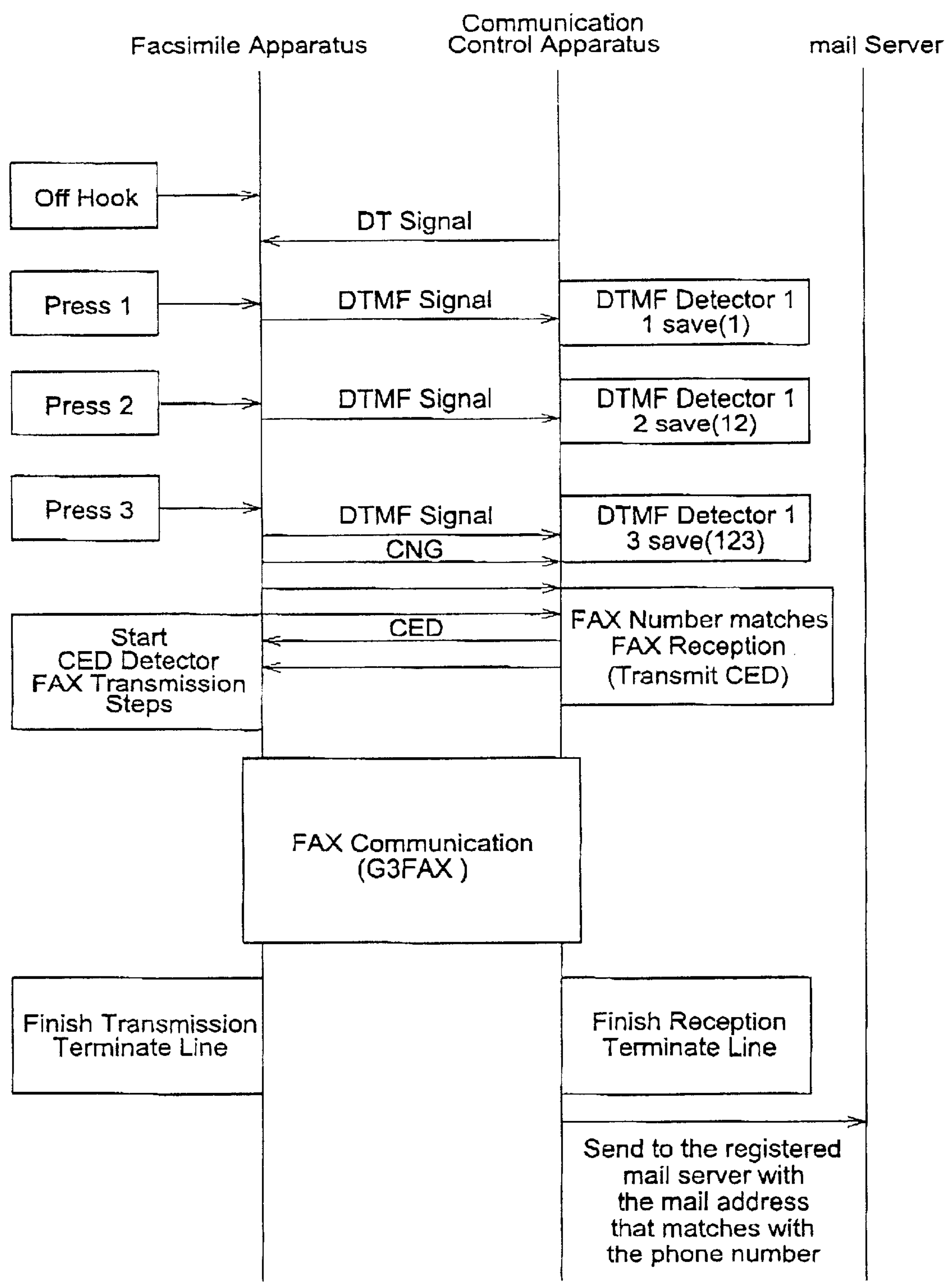
FIG. 6 is a sequence chart illustrating a facsimile transmission process of the Internet communication control apparatus according to the embodiment of the present invention.

FIG. 6 is a sequence chart illustrating a facsimile transmission process. When the facsimile apparatus is off the hook (handset is picked up), the communication control apparatus outputs a tone signal to the facsimile apparatus. Because of the tone signal, the operator finds out that the facsimile apparatus is waiting for a telephone number input. Therefore, the operator is able to input an arbitrary telephone number from the facsimile apparatus. In FIG. 6, 1, 2, and 3 are input in order. The facsimile apparatus generates a dial tone (DT) signal from the input number and outputs the same to the communication control apparatus. The communication control apparatus receives a DT signal from the facsimile apparatus and stores one by one. When the signal "123" is stored, the communication control apparatus recognizes that the signal is a pre-registered number. Then, the facsimile apparatus transmits CNG, and the communication control apparatus transmits CED in response. Accordingly, the facsimile transmission is performed between the facsimile apparatus and the communication control apparatus. After the transmission is completed, the communication control apparatus converts the received facsimile data into a TIFF file, and transmits the same via e-mail. The destination is decided by retrieving the address, in the corresponding table 15, corresponding to the number that is input from the facsimile apparatus.

In the above embodiment, by checking the existence in the facsimile table 151 or telephone table 152, an input number is used to determine whether the message is for facsimile transmission (the other side is facsimile apparatus) or for making a telephone call (the other side is a telephone). However, a configuration with one table is also suggested where determination is made by checking whether a corresponding address is an IP address or mail address, or by checking contents of a field that sets a flag for facsimile or telephone in the corresponding record.

Also, in case of a telephone with facsimile apparatus at the other side that is connected to a communication control apparatus similar to the communication control apparatus of the present invention, registering numbers can be differed between the one for facsimile transmission and for making a telephone call, so that appropriate transmission can be performed according to the purpose.

The present invention is not limited to the above-described embodiments, and various variations and modifications may be possible without departing from the scope of the present invention.

This application is based on the Japanese Patent Application No. 2001-200617 filed on Jul. 2, 2001, entire content of which is expressly incorporated by reference herein.

What is claimed is:

1. An Internet communication control apparatus that is connected to a facsimile apparatus and a communication terminal including a telephone, and is connected to an Internet, and that performs a transmission and a reception via a destination terminal and Internet, the Internet communication control apparatus comprising:

a table configured to store a destination number and a destination address in association with each other;

a converter configured to convert a DTMF signal received from the communication terminal into a destination number; and a controller configured to refer to the table, to output a destination address from the converted destination number, and to determine whether the destination terminal is one of a facsimile apparatus and a telephone; wherein the controller performs one of a facsimile transmission process and a telephone communication process according to a result of the determination.

2. The Internet communication control apparatus of claim 1, wherein the table comprises a facsimile table and a telephone table.

3. The Internet communication control apparatus of claim 2, wherein the controller determines whether the destination terminal is one of the facsimile apparatus and the telephone, based on the table that includes the destination number.

4. The Internet communication control apparatus of claim 1, wherein the table stores a mail address as a destination address, when the destination is a facsimile apparatus, and stores an IP address as a destination address, when the destination is a telephone.

5. The Internet communication control apparatus of claim 4, wherein the controller determines whether the destination terminal is one of the facsimile apparatus and the telephone, based on the destination address that is stored in the table.

6. An Internet communication control method for an Internet communication control apparatus that is connected to a facsimile apparatus and a communication terminal including a telephone, and is connected to an Internet, and that performs transmission and reception via a destination terminal and Internet, the Internet communication control apparatus having a table that stores a destination number and a destination address in association with each other, the Internet communication control method comprising:

converting a DTMF signal received from the communication terminal into a destination number;

outputting the destination address from the converted destination number by referring to the table;

determining whether the destination terminal is one of a facsimile apparatus and a telephone, based on the table; and performing one of a facsimile transmission process and a telephone communication process according to a result of the determination.

7. A communication control apparatus, selectively connected to a facsimile apparatus and a communication terminal including a telephone, that performs a transmission and a reception via a destination terminal, the communication control apparatus comprising:

a table configured to store a destination number and a destination address in association with each other;

a converter configured to convert a DTMF signal received from the communication terminal into a destination number; and a controller configured to refer to the table, to output a destination address from the converted destination number, and to determine whether the destination terminal is one of a facsimile apparatus and a telephone, wherein said communication control apparatus is interposed between an Internet access point and said selectively connected facsimile transmission apparatus and communication terminal.

8. The Internet communication control apparatus of claim 7, wherein the table comprises a facsimile table and a telephone table.

9. The Internet communication control apparatus of claim 8, wherein the controller determines whether the destination terminal is one of the facsimile apparatus and the telephone, based on the table that includes the destination number.

10. The Internet communication control apparatus of claim 7, wherein the table stores a mail address as a destination address, when the destination is a facsimile apparatus, and stores an IP address as a destination address, when the destination is a telephone.

11. The Internet communication control apparatus of claim 10, wherein the controller determines whether the destination terminal is one of the facsimile apparatus and the telephone, based on the destination address that is stored in the table.

* * * * *